(12) United States Patent
Pivac

(10) Patent No.: US 6,923,453 B2
(45) Date of Patent: Aug. 2, 2005

(54) SUSPENSION LEVELING SYSTEM

(75) Inventor: Mark J. Pivac, Lesmurdie (AU)

(73) Assignee: Caterpillar Inc, Peoria, IL (US)

( * ) Notice: Subject to any disclaimer, the term of this patent is extended or adjusted under 35 U.S.C. 154(b) by 291 days.

(21) Appl. No.: 09/885,263

(22) Filed: May 29, 2001

(65) Prior Publication Data

US 2003/0094775 A1 May 22, 2003

(51) Int. Cl.$^7$ .............................................. B60G 17/00
(52) U.S. Cl. .............................. 280/6.154; 280/5.506; 280/5.507; 280/5.519; 280/280; 280/5.501
(58) Field of Search ...................... 280/6.154, 6.155, 280/6.156, 6.157, 5.506, 5.507, 5.501, 5.519, 6.15

(56) References Cited

U.S. PATENT DOCUMENTS

| 3,357,512 A | | 12/1967 | Wilson |
| 3,930,550 A | * | 1/1976 | Rose et al. ............... 180/24.08 |
| 4,099,733 A | * | 7/1978 | Ahonen ...................... 280/400 |
| 4,152,004 A | | 5/1979 | Schroder |
| 4,230,341 A | * | 10/1980 | Hart et al. .............. 280/124.28 |
| 4,350,190 A | * | 9/1982 | McColl ...................... 144/4.1 |
| 4,397,474 A | * | 8/1983 | Mettetal ................... 280/476.1 |
| 4,557,497 A | * | 12/1985 | Rumminger ................ 280/403 |
| 4,702,843 A | * | 10/1987 | Oswald et al. ............ 280/5.507 |
| 4,750,751 A | * | 6/1988 | Schafer ...................... 56/16.5 |
| 4,787,644 A | * | 11/1988 | Yokote et al. ........... 280/6.157 |
| 4,861,065 A | * | 8/1989 | Cote ....................... 280/6.154 |
| 5,024,465 A | | 6/1991 | Baiker |
| 5,142,897 A | * | 9/1992 | Pischke et al. ............... 73/1.81 |
| 5,178,402 A | * | 1/1993 | Love et al. ............... 280/6.154 |
| 5,316,326 A | * | 5/1994 | Kyriacou ..................... 280/104 |
| 5,353,988 A | * | 10/1994 | Gallenberg ................. 239/164 |
| 5,415,586 A | * | 5/1995 | Hanson et al. ................. 460/8 |
| 5,487,006 A | * | 1/1996 | Kakizaki et al. .............. 701/38 |
| 5,538,266 A | * | 7/1996 | Martin et al. ............ 280/6.154 |
| 5,709,394 A | * | 1/1998 | Martin et al. ............ 280/6.154 |
| 5,797,607 A | | 8/1998 | Kopczynski |
| 5,813,697 A | | 9/1998 | Bargenquast et al. |
| 5,865,444 A | * | 2/1999 | Kempf et al. ............ 280/6.154 |
| 5,988,654 A | | 11/1999 | Wix et al. |
| 5,997,013 A | | 12/1999 | Claxton |
| 6,027,173 A | | 2/2000 | Bettini |
| 6,126,178 A | | 10/2000 | Chino |
| 6,131,918 A | | 10/2000 | Chino |
| 6,131,919 A | | 10/2000 | Lee et al. |
| 6,173,973 B1 | | 1/2001 | Robinson |
| 6,273,203 B1 | * | 8/2001 | Paggi et al. ............. 180/89.13 |
| 6,311,795 B1 | * | 11/2001 | Skotnikov et al. ........... 180/8.3 |
| 6,452,487 B1 | * | 9/2002 | Krupinski ................... 340/440 |

FOREIGN PATENT DOCUMENTS

DE          19717866 A1    10/1998

* cited by examiner

Primary Examiner—Eric Culbreth
(74) Attorney, Agent, or Firm—James Smith

(57) ABSTRACT

In the operation of work machines of the type required to carry heavy loads over uneven ground conditions, it is oftentimes desirable to provide the work machine with a way to automatically maintain the chassis in a substantially horizontal condition. The present invention provides a work machine having a chassis and at least one elongate member having a first end rotatably coupled with the chassis. Also provided is a controller and a position sensor coupled to at least one of the elongate members which generates a position signal indicative of an orientation of the elongate member relative to the chassis and relays the position signal to the controller. The controller, in response to the position signal, determines an actual height of the chassis from the position signal and adjusts the actual chassis height to conform to a controller-inputted desired chassis height.

17 Claims, 2 Drawing Sheets

SUSPENSION LEVELING SYSTEM

TECHNICAL FIELD

This invention relates to a suspension leveling system and, more specifically, to a suspension leveling system thereof for maintaining the chassis of a work machine substantially horizontal during operation.

BACKGROUND

Work machines of the type used to remove downed timber from timber harvest areas oftentimes must navigate across rough terrain consisting of uneven ground slopes and obstacles such as stumps, downed timber and rocks. For certain work machines such as the forwarder which are required to traverse this type of terrain while transporting heavy loads it becomes important to maintain the load in a substantially horizontal orientation so as to prevent tipping of the work machine.

A prior art example of a method of automatically adjusting a body of a tractor to a horizontal position can be found can be found in U.S. Pat. No. 6,131,919 which issued on Oct. 17, 2000 to Lee et al. Although the arrangement and corresponding method taught by Lee et al. may be adequate for its intended purpose, it fails to teach an arrangement and method thereof for ensuring that all of the wheels of the work machine remain in contact with the grounds surface.

The subject invention is directed at overcoming one or more of the problems as set forth above.

SUMMARY OF THE INVENTION

In one aspect of the present invention, a work machine is provided. The work machine includes a chassis and at least one elongate member having a first end rotatably coupled to the chassis. Also provided is a controller and a position sensor coupled to at least one of the elongate members which generates a position signal indicative of an orientation of the elongate member relative to the chassis and relays the position signal to the controller. The controller, in response to the position signal, determines an actual height of the chassis from the position signal and adjusts the actual chassis height to conform to a controller-inputted desired chassis height.

In another aspect of the present invention, a method of stabilizing the chassis of a work machine of the type having at least one elongate member having a first end rotatably coupled with the chassis is provided. The method comprises the steps of: providing a controller; providing a position sensor coupled to at least one of the elongate members; the position sensor generating a position signal indicative of an orientation of the elongate member relative to the chassis and relaying the position signal to the controller; and the controller, in response to the position signal, determining an actual height of the chassis from the position signal and adjusting the actual chassis height to conform to a controller-inputted desired chassis height.

DETAILED DESCRIPTION

Figure 1:
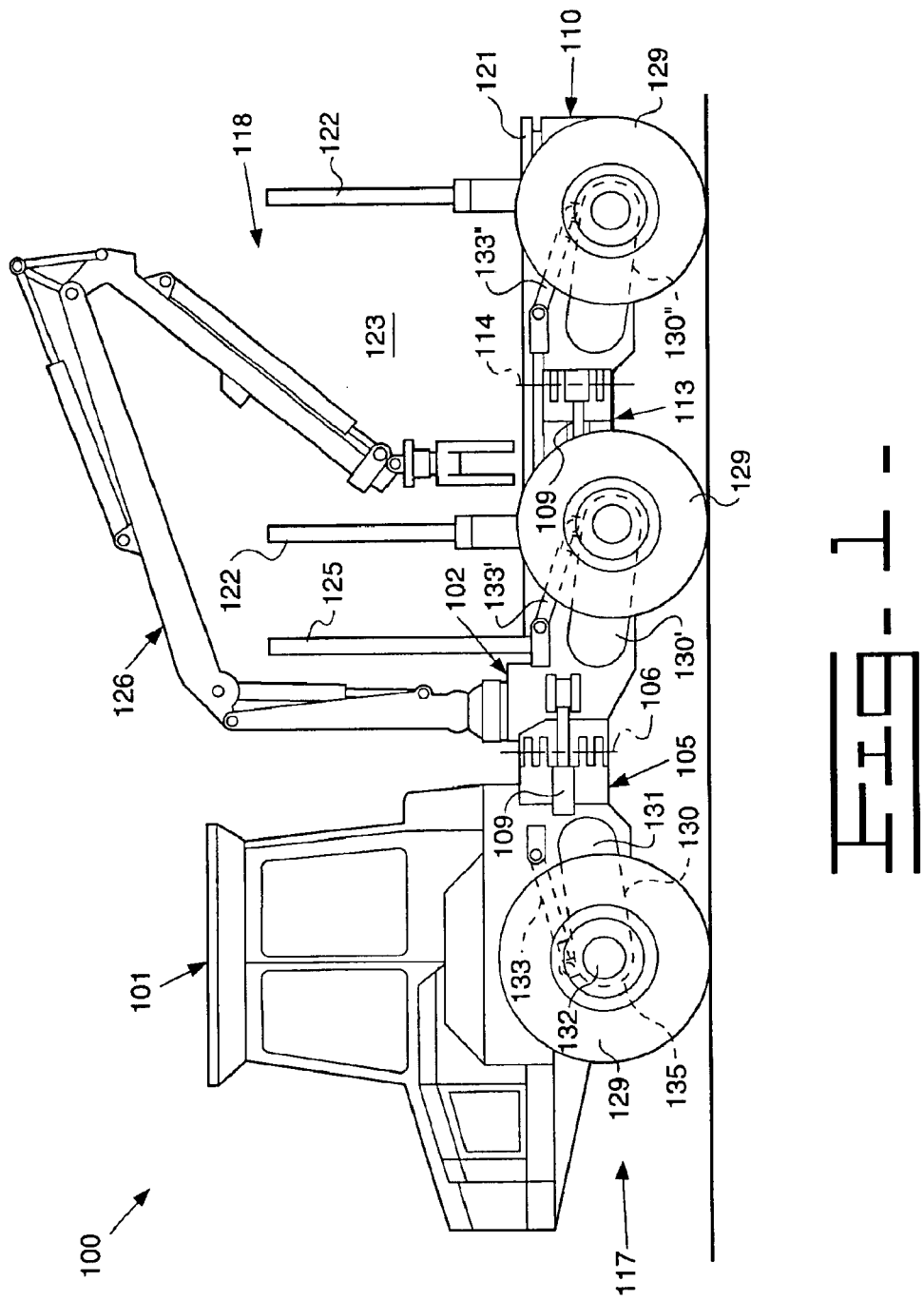
FIG. 1 is a diagrammatic side elevation view of a work machine embodying the principles of the present invention.

With reference now to the Figures, shown in FIG. 1 is a work machine 100 embodying the principles of the present invention. The work machine 100 includes a cab portion 101 and a first trailer portion 102 hingedly coupled to the cab portion 101 at articulation joint 105. As should be apparent, the articulation joint 105 allows the cab portion 101 and first trailer portion 102 to be articulable relative to each other about a vertical axis 106 with articulation preferably being provided in a conventional manner such as by the use of hydraulic cylinders 109. A second trailer portion 110 is preferably hingedly coupled to the first trailer portion 102 at articulation joint 113, thereby allowing for relative articulation of the first and second trailer portions 102,110 about a vertical axis 114. As should be appreciated by those skilled in such art, such an arrangement allows for tighter turning radii than otherwise would be possible for a single trailer having the same effective length as the combined first and second trailers portions 102,110.

The cab portion 101 along with the first and second trailer portions 102,110 collectively define a chassis of the work machine 100 which is shown generally at 117. A bunk assembly 118 is pivotally attached to the chassis 117 and is defined by a central beam 121 and a plurality of posts 122 attached thereto on each side of the chassis 117 and extending upwardly therefrom. The bunk assembly 118 therefore defines an open bunk area 123 for retaining a load, for example logs, therein. A conventional gate 125 may also be attached to the central beam 121. A work implement, preferably comprising a crane 126, is pivotally attached to the chassis 117 and is used for placing the logs within the bunk area 123.

A plurality of ground engaging members, preferably comprising six tires 129 (three shown), are coupled with the chassis 117 by use of corresponding elongated members or arms 130, 130', 130" (three shown) each having a first end 131 and a second end 132. Each arm 130,130',130" is rotatably coupled with the chassis 117, typically via an axle (not shown), at the first end 131 and coupled to a tire 129 at the second end 132, and each is controlled by a respective suspension cylinder 133,133',133". As will be explained in more detail below, the suspension cylinders 133,133',133" comprise a part of a control circuit 134 which is used to adjust the vertical orientation of the tires 129 relative to the chassis 117 in order to maintain the bunk assembly 118 substantially horizontal as the work machine 100 traverses uneven terrain. It is to be understood that although only three arms 130,130',130" and respective suspension cylinders 133,133',133" are shown, the work machine 100 described herein also includes three corresponding suspension cylinder/arm arrangements on the other side of the work machine 100. Furthermore, motive devices, preferably comprising hydraulic motors with one shown generally at 135, may be coupled to the second end 132 of each arm 130, 130',130" and are used to impart a motive force to each tire 129.

Figure 2:
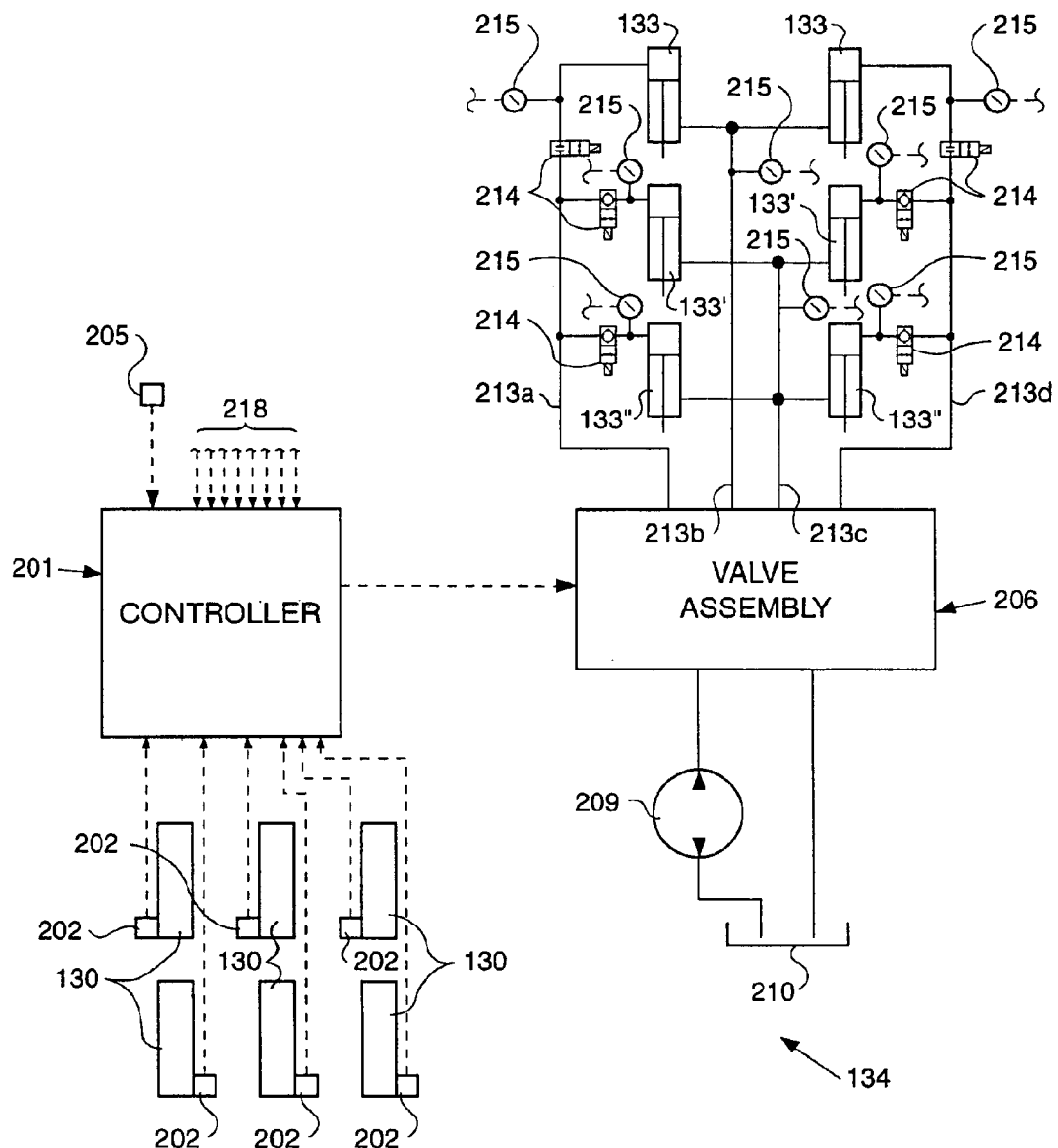
FIG. 2 is a diagrammatic illustration of a control circuit for use with the present invention.

Shown in FIG. 2 is the control circuit 134 of the present invention. The control circuit 134 utilizes a programmable microprocessor or controller 201 which mimics the manual controls so as to maintain the chassis 117 in a substantially horizontal orientation as the work machine 100 traverses uneven terrain. The control circuit 134 includes a plurality of position sensors 202, preferably comprising potentiometers, coupled to preferably each of the six arms 130,130',130". Each of the position sensors 202 generates a position signal indicative of the orientation of a corresponding arm 130, 130',130", relative to the chassis 117, which is sent to the controller 201. In addition, a roll sensor 205, preferably comprising a pendulum or other like gravity operated device, is coupled to the cab portion 101 or other location on the chassis 117 and generates an orientation signal indicative of the transverse pitch of the work machine 100 which is also sent to the controller 201. As used herein, "transverse pitch" means the slope of the ground's surface from one longitudinal side of the work machine 100 to the other longitudinal side.

Control circuit 134 includes a valve assembly 206 which is conventional for the type of work machine 100 described herein and so will not be discussed in any detail greater than necessary to explain the present invention. For the work machine 100 of the type described herein, the valve assembly 206 typically includes four solenoid operated three way directional control valves (not shown) which route hydraulic fluid to the suspension cylinders 133,133',133", via pump 209, and back to the reservoir 210 in response to inputs from either the controller 201 or manual controls (not shown). A plurality of primary conduits 213a–d conveys hydraulic fluid to and from the suspension cylinders 133,133',133". A plurality of locking devices, preferably comprising lock valves 214, are in fluid communication with primary conduits 213a and 213d and are used to selectively lock one or more of the suspension cylinders 133,133' or 133" in place. Pressure sensors 215 may also be included and are used to sense pressure acting on each suspension cylinder 133,133' and 133" and relaying the pressure information to the controller 201 via suitable leads 218.

Industrial Applicability

With reference to the drawings and in operation, the controller 201 is programmed with an algorithm to assist in maintaining the chassis 117 in a substantially horizontal position as the work machine 100 traverses uneven terrain, thereby relieving the operator of this task. Two modes of operation are possible with the present invention: (1) a MANUAL mode allowing for manual control of the orientation of the work machine 100; and (2) AUTO mode which automatically processes the position and orientation signal inputs received from the respective sensors 202,205 so as to maintain the chassis 117 in the aforementioned substantially horizontal position.

As the name implies, MANUAL mode allows the operator to manually control the orientation of the work machine 100 relative to the horizontal via the conventional valve assembly 206. Possible orientations include raising and lowering the work machine 100, tilting the work machine 100 forward and back, and rolling the work machine 100 left and right. In addition, by manually locking one or more of the lock valves 214 and directing the chassis 117 to lower, the unlocked tire(s) 129 can be raised off of the ground's surface.

When placed in the AUTO mode, the control circuit 134, via the programmed algorithm, seeks to mimic what would otherwise be manual inputs by the operator. Upon receiving the aforementioned position and orientation signals, the controller 201 is programmed to seek a dead band of ride height and pitch angle based upon ground slope (e.g., obtains an average slope) from which the chassis 117 is placed in the desired horizontal position. By providing the controller 201 with the aforementioned programming, a work machine 100 with increased stability may be achieved. More precisely, the aforementioned algorithm prevents the tires 129 from reaching their respective limits of travel. For example, if a tire 129 encounters a depression or protrusion which is deeper or higher than the length of the respective arm, for example arm 130, the remaining arms 130',130" are controlled to either lower the chassis 117 to ensure that the tire 129 encountering the depression remains in contact with the ground's surface, or raise the chassis 117 to ensure that the remaining tires 129 remain in contact with the ground's surface.

Furthermore, when the work machine 100 encounters a transverse slope, the roll sensor 205 relays the transverse orientation of the work machine 100, relative to the horizontal, to the controller 201 via the orientation signal. The controller 201 then compares the actual transverse orientation of the work machine 100 with the programmed transverse orientation limit. If the actual transverse orientation exceeds the aforementioned transverse orientation limit, the controller directs all the tires 129 (via the suspension cylinders 133,133',133") on the lowermost side of the work machine 100 to raise and/or all of the tires 129 on the highest side of the work machine 100 to lower. As should be appreciated by those of ordinary skill in such art, while operating in the AUTO mode the operator may still use the manual controls to manually change the transverse pitch of the work machine 100. However, while in AUTO mode, the aforementioned algorithm overrides the manual controls to prevent the work machine 100 from exceeding the predetermined transverse orientation limit.

Other aspects, objects and advantages of this invention can be obtained from a study of the drawings, the disclosure and the appended claims.

What is claimed is:

1. A work machine for traversing terrain, comprising:
   a chassis;
   at least one ground engaging member having limits of travel;
   at least one elongate member each having a first end and a second end;
   said first end rotatably coupled with said chassis;
   said second end coupled to said ground engaging member;
   a position sensor for generating a position signal indicative of an orientation of said elongate member relative to said chassis and relaying said position signal to said controller;
   a roll sensor for generating a orientation signal indicative of a transverse pitch of said chassis and relaying said orientation signal to said controller; and
   a controller for calculating an average slope value of the terrain and adjusting the chassis to a desired orientation in response thereto based on said position signal and said orientation signal;
   wherein said controller adjusts the chassis in response to said position signal of at least one of said ground engaging member reaching said limits of travel.

2. The work machine as set forth in claim 1 wherein said position sensor comprises a potentiometer.

3. The work machine as set forth in claim 1 wherein said chassis includes:
   a cab portion; and
   a first trailer portion hingedly coupled to said cab portion.

4. The work machine as set forth in claim 3 including a second trailer portion coupled to said first trailer portion.

5. The work machine as set forth in claim 4 wherein said second trailer portion is articulable relative to said first trailer portion.

6. The work machine as set forth in claim 1 including a motive device coupled to said second end for imparting motion to said ground engaging member.

7. The work machine as set forth in claim 6 wherein said motive device is a hydraulic motor.

8. The work machine as set forth in claim 1 wherein:
   said controller, in response to at least one of said position signal or said orientation signal, adjusts at least one said elongate member to orient said chassis substantially horizontally.

9. The work machine as set forth in claim 1 wherein said roll sensor comprises a gravity operated sensor.

10. The work machine as set forth in claim 9 wherein said gravity operated sensor is a pendulum.

11. A method of stabilizing the chassis of a work machine used for traversing terrain and having at least one elongate member having a first end rotatably coupled with the chassis and having limits of travel, comprising the steps of:

sensing the orientation of at least one of the elongate members and generating a position signal in response thereto;

sensing the transverse pitch of the chassis and generating an orientation signal in response thereto;

sensing when the said elongate member is reaching said limits of travel in response to said position signal;

calculating an average slope value of the terrain based on said position signal and orientation signal;

adjusting the chassis to a desired orientation in response to said average slope value; and adjusting the chassis in response to at least one of said elongate member reaching said limits of travel.

12. The method as set forth in claim 11 wherein the desired orientation of the chassis is substantially horizontal.

13. The method as set forth in claim 12 wherein said step of sensing the transverse pitch of the chassis is with a gravity operated sensor.

14. The method as set forth in claim 11 including the step of:

providing the chassis with a cab portion and a first trailer portion hingedly coupled to said cab portion.

15. The method as set forth in claim 14 including the step of providing a second trailer portion coupled to said first trailer portion.

16. The method as set forth in claim 11 wherein said step of sensing the orientation of at least one of the elongate members is with a potentiometer.

17. A method of stabilizing the chassis of a work machine used for traversing terrain and having at least one elongate member having a first end rotatably coupled with the chassis and having limits of travel, comprising the steps of:

sensing the orientation of at least one of the elongate member and generating a position signal in response thereto;

sensing when the said elongate member is reaching said limits of travel in response to said position signal; and adjusting the chassis in response to said elongate member reaching said limits of travel.

* * * * *